G. W. WHITWORTH.
RACK FOR SEED CORN.
APPLICATION FILED SEPT. 21, 1912.

1,071,842.  Patented Sept. 2, 1913.

WITNESSES

INVENTOR
Geo. W. Whitworth
by G. C. Kennedy
ATTORNEY

UNITED STATES PATENT OFFICE.

GEORGE W. WHITWORTH, OF CEDAR FALLS, IOWA.

RACK FOR SEED-CORN.

1,071,842.  Specification of Letters Patent.  Patented Sept. 2, 1913.

Application filed September 21, 1912. Serial No. 721,608.

*To all whom it may concern:*

Be it known that I, GEORGE W. WHITWORTH, a citizen of the United States of America, and a resident of Cedar Falls, Blackhawk county, Iowa, have invented certain new and useful Improvements in Racks for Seed-Corn, of which the following is a specification.

Figure 1:
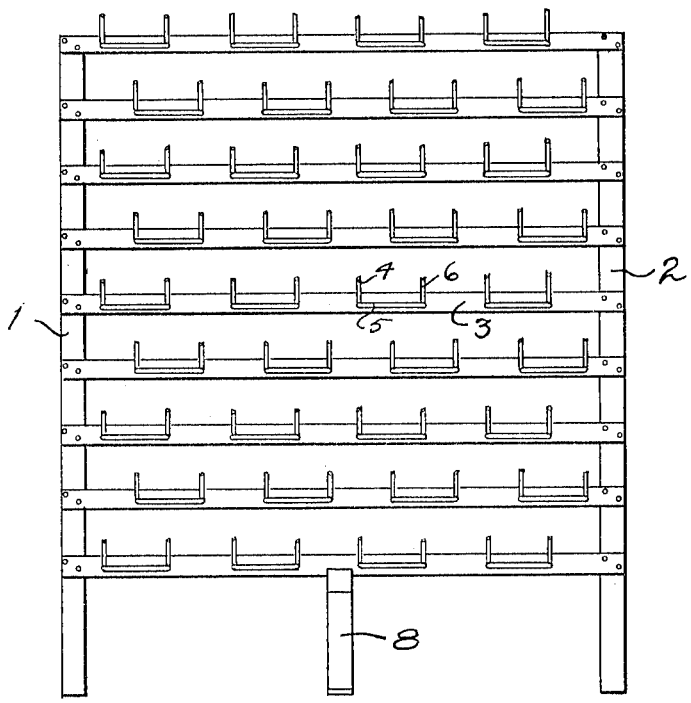
Figures 2, 3:
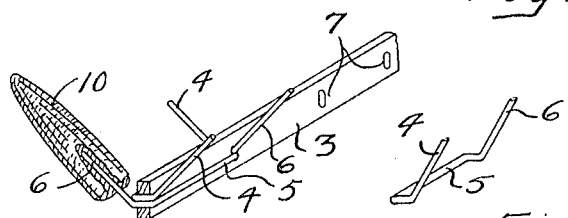
Figure 4:
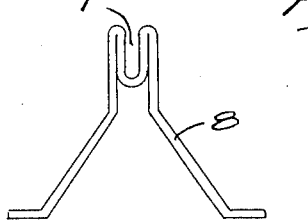

My invention relates to improvements in racks for seed corn, and the object of my improvement is to supply an inexpensive and knockdown form of rack having holding-bodies for ears of seed corn adapted to retain same in a favorable position for drying, preservation and inspection. This object I have accomplished by the means which are hereinafter described and claimed, and which are illustrated in the accompanying drawings, in which:

Figure 1 is a side elevation of my improved rack for seed-corn. Fig. 2 is a perspective view of a portion of one of the supporting bodies or rack-bars, showing the method of mounting the ear-holding arms thereon. Fig. 3 is a perspective view of one only of the ear-holding devices as separated from the rack and in its bent condition. Fig. 4 is a side elevation of a detachable spreader-foot for the rack.

Similar numerals denote corresponding parts throughout the several views.

My rack is formed of a plurality of supporting-bodies or horizontal bars 3 disposed regularly above one another, spaced apart and having the ends connected to standards 1 and 2. The lowermost bar 3 is supported by a spreader-foot or support 8, comprising a bar medially bent into a depending loop 9 in which the bar 3 is seated removably, while the extremities of the bar are spread apart outwardly to form stable supporting members extending oppositely on either side of said rack to prevent its being overturned. The said spreader-foot may be removed when the rack is not in use.

The bars 3 may be used singly if desired, or may be arranged and mounted or supported in any other feasible manner as desired or than as shown.

Each bar 3 is provided with a plurality of transverse vertical slots 7, which are arranged in pairs, and the said pairs of slots are arranged in staggered relation to the similar pairs in the bars above and below them.

The ear-holding means are thus described: A short metal rod is bent into a U-shape to have parallel end members 4 and 6 extending in the same general direction and having the connecting part 5. Referring to Fig. 2, it will be seen that the ends 4 and 6 are inserted in the pair of slots 7, being passed therethrough until the connecting part 5 comes in contact with the bar 3. The ends 4 and 6 are then bent upwardly obliquely, which, as shown in Fig. 3, produces a lock-joint between the said members and said bar 3, preventing their separation, and holding the members rigidly in place as supporting members for ears of corn, the latter being located on the pointed ends of said members as shown at 10 in Fig. 2, which shows one of the members 6 inserted into the butt of the cob to hold the ear inclined upwardly and outwardly. Another holding-body of like form is placed with its holding-members 4 and 6 inserted through the same slots as the other said members of the first-mentioned holding-body, but with the ends thereof extended therethrough in a similar way in an opposite direction, and then bent upwardly obliquely in a like manner. This arrangement, as shown, furnishes holding members on each side of the bar 3, and the parts of the members of the two holding-bodies which are inserted in superposed relation in said slots fill the slots, and bind each other in a secure position therein. The said holding-bodies may be removed by bending their extremities down, and then passing them back through the slots. When so arranged in a staggered manner along the rack-bars the ears thereon do not interfere, and all the space on both sides of the rack is utilized.

Having described my invention, what I claim as new, and desire to secure by Letters-Patent, is:

1. In a rack for seed-corn, a body having a pair of horizontally spaced transverse orifices, and a rod bent into two arms connected by a cross-part, said arms being inserted in said orifices as far as said cross part and then bent upwardly and obliquely.

2. In a rack for seed-corn, a body having a pair of transverse orifices, and a rod bent into two parallel arms extending in the same direction and connected by a cross part, said arms being inserted in said orifices as far as said cross part and then bent at the places where they issue from said orifices, upwardly.

3. In a rack for seed-corn, a supporting-body having a pair of transverse slots, and a pair of holding-bodies each being a rod bent into two arms connected by a cross part, said holding-bodies having their arms passed through said slots as far as their cross parts but in opposite directions to have their arms projecting respectively from said supporting-body in opposite directions.

4. In a rack for seed-corn, a supporting-body having a pair of transverse slots, and a pair of holding-bodies each being a rod bent into two parallel arms extending in the same direction and connected by a cross part, the said holding-bodies having their arms passed through said slots as far as their cross parts in opposite directions to have their arms projecting therefrom oppositely, said arms then being bent upwardly in an inclined position.

5. In a rack for seed-corn, a supporting-frame having a plurality of pairs of transverse orifices, pairs of holding-bodies each being a rod bent into U-shaped form and each pair having its arms passed oppositely to the other respectively through the same pair of orifices to project therefrom oppositely and then bent upwardly, said arms having their cross-connecting parts in contact with opposite faces of their supporting body to prevent displacement of their members in a sidewise direction.

6. In a rack for seed-corn, a supporting-frame composed of a plurality of spaced-apart bars in superposed relation, means for supporting the ends of said bars, said bars each having a plurality of pairs of transverse vertical slots, the pairs in each bar being arranged in a staggered relation to the pairs in the bars immediately adjacent thereto, a plurality of pairs of holding-bodies adapted to coöperate with said orificed bars by having their extremities bent into U-shapes and passed oppositely through said orifices and then bent in an inclined position upwardly and outwardly with their cross-connecting parts engaged with opposite sides of said bars.

7. In a rack for seed-corn, a supporting-body having a pair of vertical transverse slots, and a pair of holding-bodies each being a rod bent into two arms connected by an integral cross part, said holding-bodies having their arms passed through said slots in opposite directions, the parts of said arms within the slots being superposed upon one another to interlock each other with the walls of the slots.

8. In a rack for seed-corn, a horizontal supporting-body, said body having horizontally-spaced transverse orifices, and holding-bodies bent to have arms projecting in substantially the same direction and passed through said orifices to have the ends of the arms thereof projecting in pairs in opposite directions.

9. In a rack for seed-corn, a supporting-body having a pair of transverse orifices, and a pair of holding-bodies each being a rod bent to have arms turned in the same direction with the arms of one pair passed through said orifices in a direction opposite to the direction in which the arms of the other pair are passed through the same orifices, and the two sets of arms being so engaged with each other and the walls of the orifices as to be interlocked when tension is applied to said arms.

Signed at Waterloo, Iowa, this 9th day of Sept. 1912.

GEORGE W. WHITWORTH.

Witnesses:
 GEO. C. KENNEDY,
 W. H. BRUNN.

---

Copies of this patent may be obtained for five cents each, by addressing the "Commissioner of Patents, Washington, D. C."